INVENTORS
Samuel G. Eskin,
Adele M. Arkelyan
BY and Harold W. Rice.

THEIR ATTORNEY

Aug. 19, 1952  S. G. ESKIN ET AL  2,607,531
COMBINED THERMOSTAT AND AUTOMATIC PILOT CONTROL
Filed June 17, 1950  4 Sheets-Sheet 3

INVENTORS
Samuel G. Eskin,
Adele M. Arkelyan
and Harold W. Rice.
BY
Albert J. Henderson
THEIR ATTORNEY Aug. 19, 1952  S. G. ESKIN ET AL  2,607,531
COMBINED THERMOSTAT AND AUTOMATIC PILOT CONTROL
Filed June 17, 1950  4 Sheets-Sheet 4

INVENTORS
Samuel G. Eskin,
Adele M. Arkelyan
BY and Harold W. Rice.

Albert J. Henderson
THEIR ATTORNEY

Patented Aug. 19, 1952

2,607,531

UNITED STATES PATENT OFFICE 2,607,531

COMBINED THERMOSTAT AND AUTOMATIC PILOT CONTROL

Samuel G. Eskin, Harold W. Rice, and Adele M. Arkelyan, Los Angeles, Calif., assignors to Robertshaw-Fulton Controls Company, Greensburg, Pa., a corporation of Delaware Application June 17, 1950, Serial No. 168,792

9 Claims. (Cl. 236—21)

This invention relates to combination controls for gaseous fuel burners wherein the temperature controlling device and the pilot cut-off both operate upon a single control valve.

The present invention is particularly adapted, although not limited, for use with gas-burning water-heaters and the like wherein water temperatures are to be controlled within precise limits. The thermostatic device which is responsive to the water temperature is preferably of the rod-and-tube type having a temperature adjusting dial located on the front face of the control body for ready access by the user. A main gas cock controls the flow of fuel to the burner and has a control knob positioned adjacent the temperature adjustment means. The automatic pilot control in this embodiment includes an expansible thermal element of the mercury vapor-pressure type responsive to the flame of the pilot burner.

Since provision may be made for complete shut-off of fuel to both the main and pilot burners under automatic control, a separate pilot valve can be provided for conjoint operation to closed position with the main burner valve. Operation of such a pilot valve to open position can conveniently be effected by a control handle on the front face of the control body adjacent the temperature adjustment means. An interlock between the main gas cock and the pilot valve will permit operation of the latter to open position only when the gas cock is in the "Pilot" position and is thus positioned for preventing flow of fuel to the main burner valve. Thereafter, the pilot valve is maintained open by operation of the automatic pilot control whenever the pilot burner is producing a flame for heating the expansible thermal element.

The invention provides for locating the expansible thermal element on the side of the control body where it is normally hidden from view when the device is installed on the water heater. The diaphragm unit of this thermally responsive device is located substantially normal to the main and pilot valves. A novel lever system including a bell-crank is operative between the main burner valve and the thermostat and the automatic pilot control and also between the pilot valve, where provided, and the control handle for correlating the action of these parts to provide a complete safety in starting and under normal running conditions. The levers are removed from the path of gas flow and are not subject to corrosive influences. Moreover, a fail-safe type of unit is provided which will prevent leakage of fuel under abnormal conditions. Both the main valve and the pilot valve are accessible from the front of the control body for cleaning or repair when required.

With these and other objects and advantages in view a preferred embodiment of the invention is illustrated in the accompanying drawings wherein.

Figure 1:
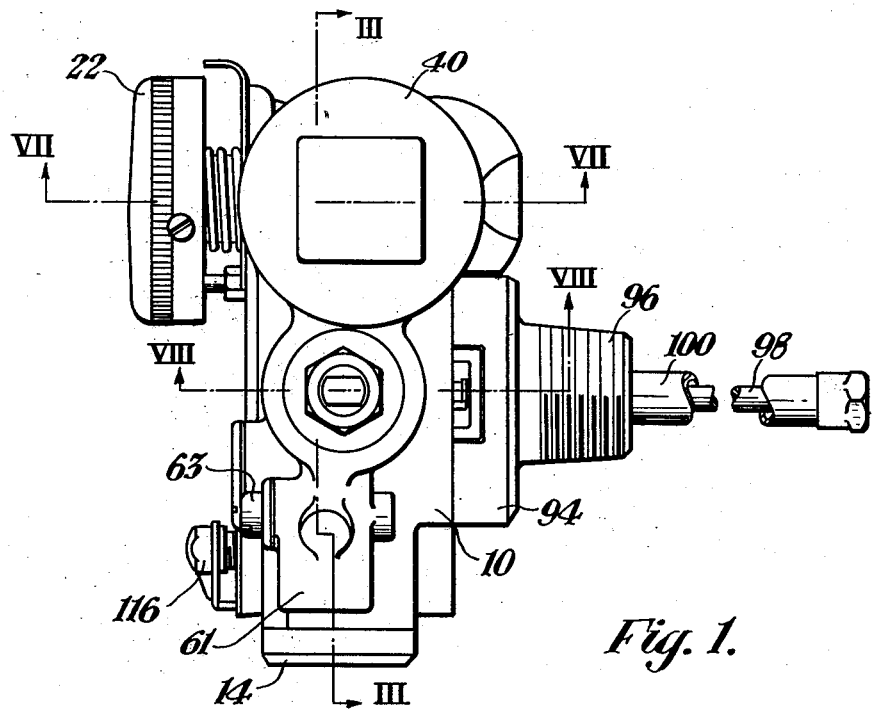
Fig. 1 is a side elevation of the control device.
Figure 2:
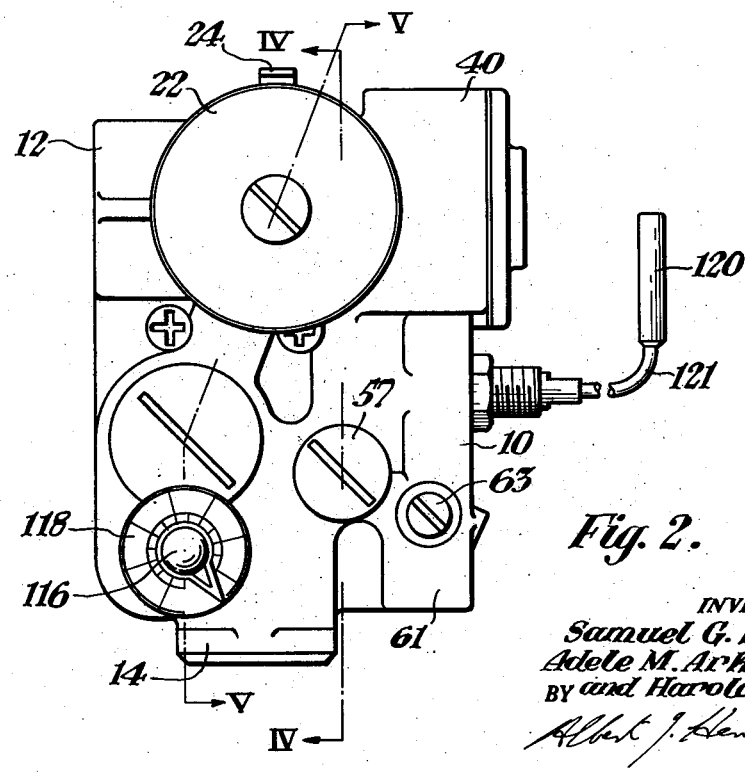
Fig. 2 is a front elevation of the control device shown in Fig. 1.
Figure 7:
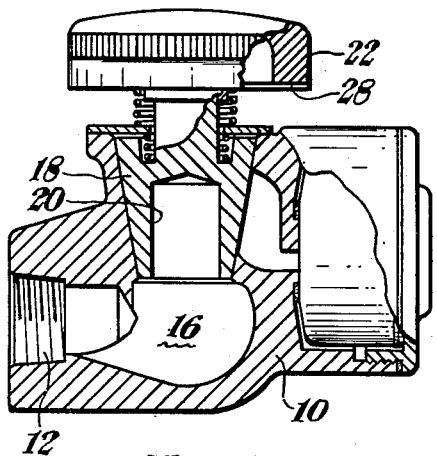
Figure 8:
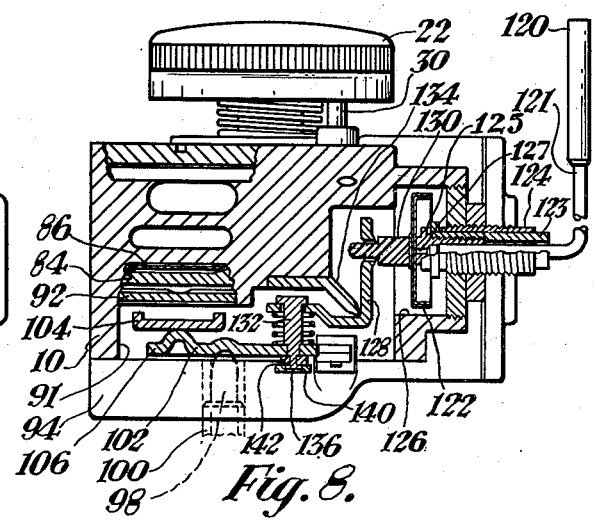
Figure 9:
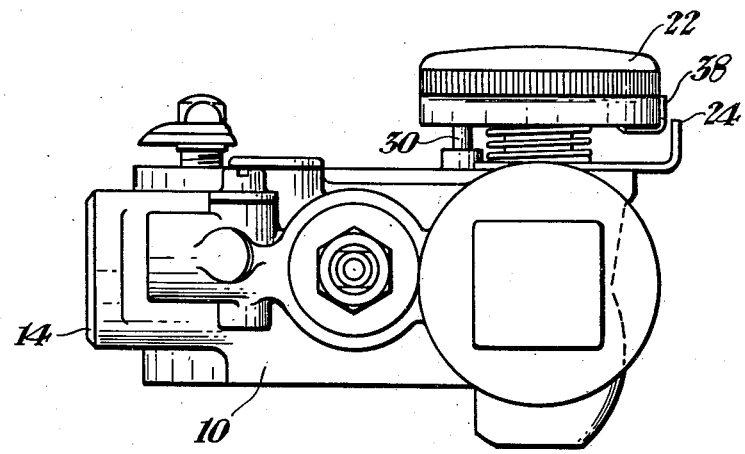
Figure 11:
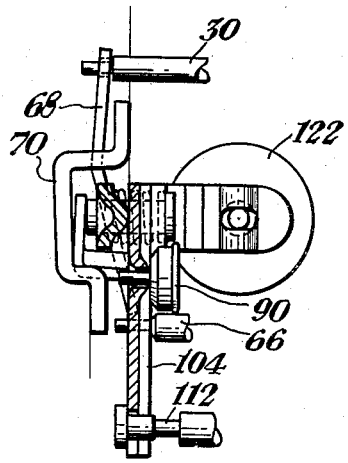
Figure 10:
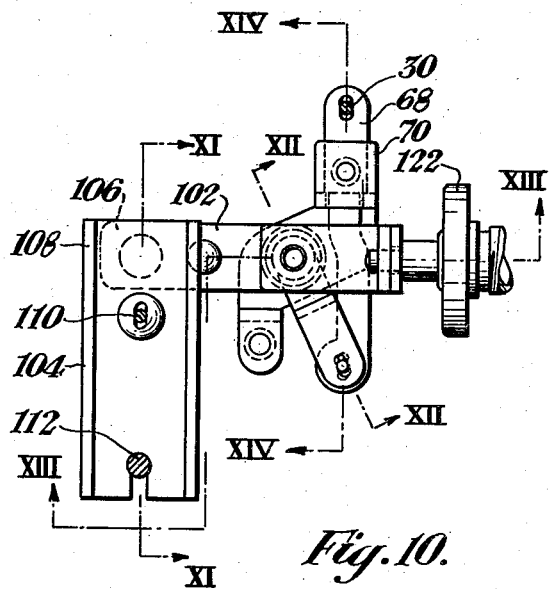
Figure 12:
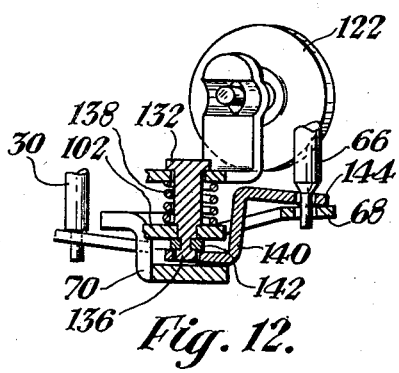
Figure 13:
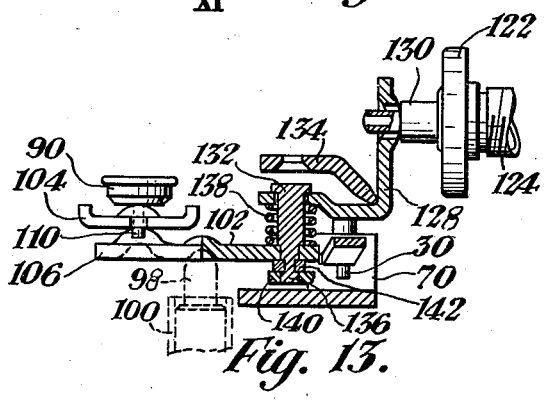
Figure 14:
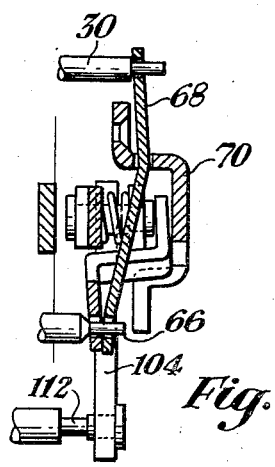

Figs. 7 and 8 are sections taken on the lines VII—VII and VIII—VIII respectively of Fig. 1 but revolved 90°, Fig. 9 is a side elevation corresponding to Fig. 1 but revolved 90°, Fig. 10 is a front elevation of the lever system separated from the control body, Figs. 11 to 14 inclusive are sectional views taken on the respective lines shown on Fig. 10.

Main shut-off cock

Referring more particularly to the drawings, the control device comprises a casing 10 provided at one end with a lateral inlet opening 12 for fuel and at the other end with an outlet opening 14 for the fuel. A main fuel passage 16 through the casing 10 provides communication between the inlet 12 and the outlet 14. As is customary in such devices, suitable pipe connections may be provided at the inlet 12 and the outlet 14 to convey fuel through the passage 16 to a main burner (not shown) of the appliance upon which the control is to be used.

The passage of fuel between the inlet 12 and the outlet 14 is under control of a main shut-off cock 18 which projects exteriorly of the front face of the casing 10. The cock 18 is provided with an angular port 20 which is movable upon manual rotation of the cock 18 to open and close communication through the passage 16 between the inlet 12 and the outlet 14. A handle or knob 22 is secured to the projecting end of the cock 18 and carries the usual indicia (not shown) for the "On," "Off" and "Pilot" positions of the main shut-off cock 18 which are adapted to register selectively with a pointer 24 secured to the casing 10 in an appropriate location.

The knob 22 is also adapted for limited axial movement relative to the cock 18 and is provided on its under side with a substantially annular recess 26 which, however, is interrupted by an unrecessed or land portion 28 (Fig. 7), which lies opposite the indicia "Pilot." A plunger 30 projects through the casing 10 substantially parallel with the axis of the main shut-off cock 18 and is adapted to be engaged by the land portion 28 upon axial movement of the knob 22 when in the "Pilot" position.

The plunger 30 is biased by a coil spring 32 outwardly of the casing 10 but such movement is limited by a collar 34 formed on the plunger 30 and engageable with the interior bottom wall of a cap nut 36 on the casing 10 and through which the plunger 30 projects. Rotation of the cock 18 is limited to an arc of approximately 180° between the "Off" and "On" positions by an adjustable stop element 38 which projects from the knob 22 for engagement with one side of the plunger 30 and by an abutment 39 on the underside of the knob 22 for engagement with the opposite side of the plunger 30.

Pilot valve

Figure 3:
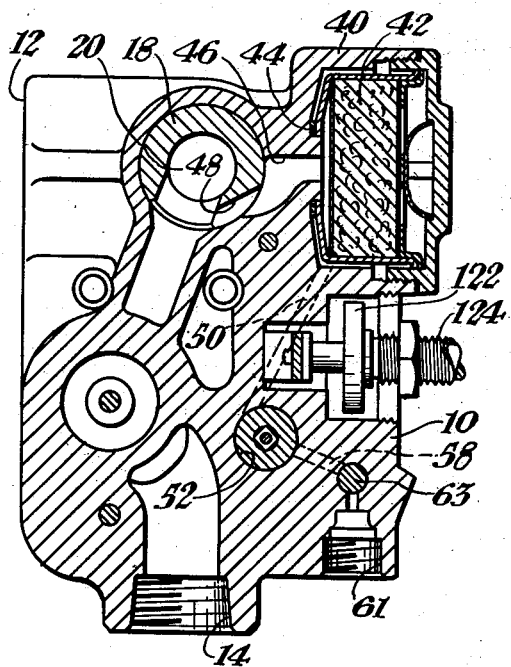
Fig. 3 is a cross-section taken on the line III—III of Fig. 1.
Figure 4:
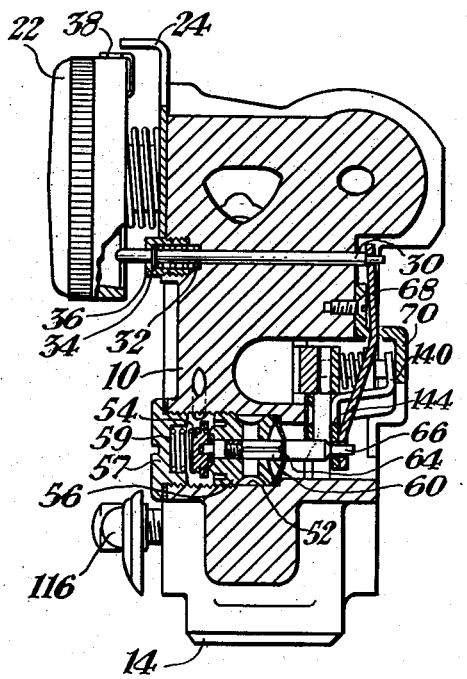
Fig. 4 is a cross-section taken on the line IV—IV of Fig. 2.

As shown more clearly in Figs. 3, 4 and 7 the casing 10 is provided with an integral hollow boss 40 disposed on one side of the shut-off cock 18 and provided with a filter cartridge 42 for the pilot fuel. The bottom wall of the filter cartridge 42 is suitably sealed, as at 44, in fluid-tight connection with the bottom wall of the hollow boss 40. The outer wall of the cartridge 42 is, however, spaced from the inner wall of the boss 40 to provide for passage of fuel therebetween. To this end, a passage 46 is formed in the casing 10 for communication at one end with an arcuate groove 48 in the side wall of the shut-off cock 18 forming an extension of the port 20 therethrough. The groove 48 affords communication between the port 20 and the passage 46 when the shut-off cock is in the "On" position and fuel is passing directly from the port 20 to the main fuel passage 16.

The opposite end of the passage 46 communicates with the hollow boss 40 adjacent the center of the filter cartridge 42 which thereby receives fuel to be filtered and emitted at the opposite end thereof. A pilot passage 50 communicates at one end with the space between the outer wall of the filter cartridge 42 and the inner wall of the hollow boss 40 and thereby forms an inlet passage to a pilot valve chamber 52 formed in the casing 10 to one side of the main fuel cock 18. A pilot valve member 54 is mounted in the chamber 52 and is reciprocable on an axis substantially parallel with that of the plunger 30 to open and close a passage through a valve seat member 56 which is supported in the chamber 52. A closure cap 57 provides access to the valve member 54 and also forms a seat for one end of a coil spring 59 serving to bias the valve member 54 toward its seat 56.

An outlet passage 58 communicates with the passage in the valve seat member 56 and thus receives a supply of fuel from the inlet passage 50 when the valve member 54 is in open position. The opposite or outlet end of the passage 58 terminates in a suitable connection 61 for a pilot conduit for supplying fuel to a pilot burner (not shown). The usual adjusting means 63 is provided in the passage 58 for flow of fuel to the pilot burner. It will be observed that the connection 61 is located adjacent the outlet 14 at the bottom of the body 10 so that no bends in the conduit will be necessary in the vicinity of the control device.

Movement of the pilot valve member 54 between open and closed positions is effected by operation of a valve stem 60 which projects through the passage in the valve seat member 56 and is suitably fluted or noncircular to permit passage of fuel thereby. The usual sealing diaphragm 64 is provided for the operating end of the valve stem 60 to prevent leakage of fuel from the chamber 52. An operating head 66 is carried on the valve stem 60 on the opposite side of the sealing diaphragm 64 therefrom to provide convenient means for moving the valve member 54 to open position when desired. Such movement is accomplished by a pilot valve lever 68 which extends from the plunger 30 to the operating head 66 and is suitably pivoted intermediate its ends in a bracket 70 carried on the casing 10.

Control valve mechanism

Figure 5:
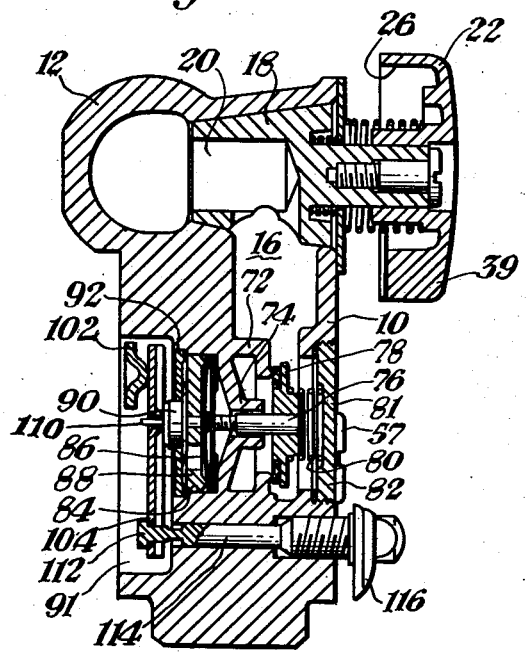
Fig. 5 is a partial section taken on the line V—V of Fig. 2.
Figure 6:
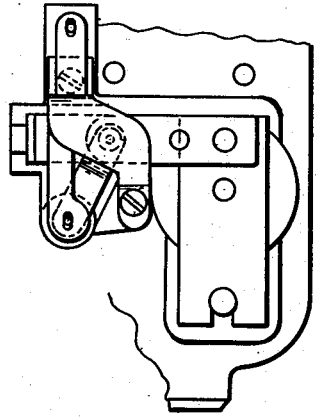
Fig. 6 is an inside elevational view of a portion of the control device.

As shown more clearly in Figs. 5 and 8 an annular valve seat member 72 is formed in the casing 10 in position to intersect the passage of fuel from the inlet 12 to the outlet 14 through the main fuel passage 16. An axial hollow boss 74 is formed within the annular valve seat 72 and provides a bearing for a valve stem 76 which is reciprocable therein. A disc valve member 78 is mounted on the valve stem 76 for axial reciprocable movement therewith between open and closed positions relative to the valve seat 72. The valve member 78 is normally biased toward the valve seat 72 by a coil spring 80 which is operative between a closure cap 82 secured to the casing 10 and the valve member 78.

The axial hollow boss 74 forms one wall of a chamber 84 in the casing 10 which houses a snap-action means of conventional form comprising clicker mechanism 86 and an annular thrust element 88 for operating the valve member 78 to open position against the bias of the coil spring 80. The thrust element 88 carries a thrust button 90 which projects through a sealing ring 92 forming an opposite wall for the chamber 84 and into a recess 91 formed in the casing 10. It will be observed that no fuel can flow from any of the various flow passages into the recess 91 due to the sealing arrangement.

Temperature regulation

Thermally responsive means for operating the valve member 78 through the clicker disc mechanism 86—90 is carried by a thermostat housing 94 which is shown in Fig. 8 as being secured to the exterior of the casing 10 across the recess 91. The housing 94 is provided with a threaded boss 96 (Fig. 1) through which the usual rod-and-tube element 98, 100 projects into the storage tank of a water heater or the like (not shown). As is customary in such devices, the rod 98, has a relatively low coefficient of expansion while the tube 100 has a higher coefficient of expansion and the differential under the influence of the heat of the water in the tank causes the rod 98 to move outwardly of the casing 10. As shown in Fig. 8, the rod element 98 projects into the recess 91 on one side of the thrust button 90 and is axially movable in a path substantially parallel with that of the valve member 78.

Means are employed for transmitting motion between the rod element 98 and the thrust button 90 and take the form of a connecting lever 102 and an operating lever 104, both of which are housed within the recess 91. As shown more clearly in Figs. 10 and 13, the connecting lever 102 is supported intermediate its ends on the rod element 98 and has a free end 106 adapted for pivotal movement relative to the thrust button 90 upon movement of the rod 98 relatively to the casing 10 upon variations in the water temperature.

The operating lever 104 has a free end 108 interposed between the free end 106 of the connecting lever 102 and the thrust button 90 and is pivotally mounted on a pin 110 projecting from the thrust button 90. The lever 104 extends substantially normal to the lever 102 and is supported at its opposite end on the projecting end 112 of an adjusting screw 114.

The adjusting screw 114 extends through the casing 10 on an axis substantially parallel with that of the valve member 78. The opposite end of the adjusting screw 114 projects exteriorly of the front face of the casing 10 and is provided with a pointer 116 cooperable with a suitable scale 118 marked on the casing 10. The adjusting screw 114 forms adjustable means for setting the temperature to be maintained by the rod-and-tube element 98, 100 upon manipulation of the pointer 116. Both the gas cock knob 22 and the temperature adjusting pointer 116 are located on the front face of the casing 10 for convenient access by the user.

Automatic pilot control

The vapor-pressure type automatic pilot control of this invention is adapted to render the rod-and-tube element 98, 100 ineffective for overcoming the bias of the valve member 78 unless the pilot burner of the appliance is producing a flame. The automatic pilot control comprises an actuating device including a bulb element 120, a capillary tube 121 and a diaphragm unit 122 as is customary in such devices. In Fig. 8 the diaphragm unit 122 is shown as being connected to the capillary tube 121 by a stud 125 having a bore 127 therethrough communicating with the diaphragm unit 122 and the capillary tube 121 and threaded into a sleeve 123 which extends through a threaded bushing 124 carried by the casing 10 for adjustment purposes. The diaphragm unit 122 projects into a chamber 126 formed in one side of the casing 10 which communicates at one end with the recess 91 but has no communication with any of the various flow passages.

The bulb element 120 contains a quantity of mercury which becomes vaporized upon the bulb element being sufficiently heated and serves to actuate the diaphragm unit 122 by expansion thereof which movement occurs on an axis substantially normal to the valve member 78. The bulb element 120 and the capillary tube 121 project from the casing 10 on the side of the control device as previously indicated. Means are employed for transmitting the movement of the diaphragm unit 122 to the connecting lever 102 which is supported for movement on the rod element 98. To this end, a bell-crank 128 has one free end mounted on a stud 130 carried by the diaphragm unit 122 and the opposite free end mounted on a stud 132 carried on the adjacent end of the connecting lever 102. The bell-crank is pivoted on a knife-edge 134 which projects internally of the casing 10 between the recess 91 and the chamber 126.

The stud 132 projects through the connecting lever 102 and carries a head 136 which bottoms upon the bracket 70 upon sufficient rotation of the bell-crank 128 when the diaphragm unit 122 expands. An override arrangement is provided in order to prevent damage to the diaphragm unit 122 should such expansion continue after the head 136 has engaged the bracket 70. Thus, the bell-crank 128 is mounted loosely on the stud 132 and a coil spring 138 is provided between the bell-crank 128 and the connecting lever 102 to urge these members apart. The arrangement is such that when the force exerted by the diaphragm unit 122 is less than the force of the spring 138 then a substantially unyielding connection is provided. However, if the force of the spring 138 is exceeded, then the bell-crank 128 moves relatively to the stud 132 on which it is mounted so that no damage to the diaphragm unit 122 can occur.

Mounted on the projecting head 136 of the stud 132 is an angular pilot valve lever 140 and a spacer washer 142. The pilot valve lever 140 (Figs. 4 and 12) has a free end 144 overlying the manually operable lever 68 at the point of engagement therewith with the operating head 66 of the pilot valve 54. The intermediate angular portion of the pilot valve lever 140 is pivoted on the bracket 70 and will serve to hold the pilot valve member 54 in open position under certain conditions when the manually operable lever 68 is released.

Operation

The control device is placed in operative condition by manual operation when the knob 22 is rotated to the "Pilot" position and pushed in axially to engage the plunger 30 with the land portion 28. The resulting movement of the plunger 30 causes the lever 68 to fulcrum about the bracket 70 in a clockwise direction as viewed in Fig. 4. The operating head 66 and the pilot valve stem 60 consequently move to the left and unseating of the pilot valve member 54 occurs.

Fuel now flows from the inlet 12, port 20 in the main shutoff cock 18, passage 46, filter cartridge 42, hollow boss 40, passage 50, pilot valve seat 56 and through passage 58 to the connection 61 for the pilot burner. It should be observed that in the "Pilot" position of the main fuel cock 18 that the angular port 20 does not place the inlet 12 in communication with the chamber 16, but merely in communication with the pilot passage 46.

The fuel flowing from the pilot burner is then ignited manually while the knob 22 remains depressed. The pilot flame heats the bulb 120 which is located adjacent to the pilot burner and forces the diaphragm unit 122 to expand. The resulting movement of the diaphragm unit 122 causes the bell-crank 128 to pivot about the knife-edge 134 in a counterclockwise direction and move the override unit until the head 136 of the stud 132 bottoms upon the bracket 70. The movement of the override unit rotates the pilot valve lever 140 counterclockwise, as viewed in Fig. 12, for holding the pilot valve member 54 in open position. The knob 22 may then be released and rotated toward the "On" position. It will be apparent that movement of the override unit until it bottoms the head 136 of the stud 132 on the bracket 70 will cause the end of the lever 102 which is cooperable with the override unit to be accurately positioned in a specific relation to the thrust button 90 when in its operating position. Should the diaphragm unit 122 expand beyond the point at which the stud 132 seats against the bracket 70, then the additional movement is taken up by the override unit becoming a yieldable device as previously described.

It may be assumed that the rod element 98 of the rod-and-tube thermal device 98, 100 is in an advanced position within the recess 91 as the water in the tank is still cold and the tube element 100 is contracted. Consequently, the end of the connecting lever 102 having been carried by movement of the stud 132 downwardly, as viewed in Fig. 13, then the free end 106 of this lever will rotate in a clockwise direction about the rod element 98 as a fulcrum. Such movement of the free end 106 of the lever 102 will be transmitted to the operating lever 104 which will fulcrum about the adjusting screw head 112 and rotate in a clockwise direction as viewed in Fig. 11. The thrust button 90 is thereupon moved axially by the lever 104 and causes the clicker mechanism 84—88 to snap over and actuate the valve member 78 to open position. The device is thus in normal running condition depending on the temperature set by the pointer 116 on the scale 118.

As the water in the tank increases in temperature, the rod element 98 will be retracted away from the casing 10 and the force exerted by the lever 104 on the thrust button 90 will cease. Thus, the valve member 78 will move toward closed position relative to the valve seat 72 to shut-off flow of fuel through the outlet 14 to the main burner. Such operation of the valve member 78 between open and closed positions will continue as necessary to maintain the temperature set by the pointer 116. Since the normal operating position of the end of the lever 102 which cooperates with the override unit is always the same due to the abutting relation in such position of the head 136 of the stud 132 and the bracket 70, it will be apparent that the temperature at which the thrust button will be actuated by the lever 104 will depend solely upon the location of the fulcrum of the lever 104 (the head 112 of the adjusting screw 114). Thus the water temperature at which the valve member will be actuated will depend solely upon the setting of the adjusting screw 114.

Should the flame at the pilot burner become extinguished then the bulb element 120 will become cooled allowing the diaphragm unit 122 to contract. The resulting clockwise movement of the bell-crank 128, in Fig. 13 will retract the stud 132 and cause the connecting lever 102 to rotate in a counterclockwise direction about the rod element 98. Hence, as the free end 106 of the connecting lever 102 no longer exerts a force upon the operating lever 104, the valve spring 80 is free to exert its bias to move the valve member 78 to closed position and shut-off flow of fuel through the outlet 14. Thus, the rod element 98 is no longer capable of opening the valve member 78 regardless of the cooling of the water in the tank.

Simultaneously with operation of the lever 102 as described, the pilot valve lever 140 is also caused to follow the movement of the stud 132. Thus, the pilot valve spring 59 is free to exert its bias for pivoting the lever 140 in a clockwise direction (Fig. 12) about the edge of the bracket 70 as a fulcrum and the pilot valve member 54 moves to closed position to shut-off flow of fuel to the pilot outlet 61. It is apparent, therefore, that flow of fuel to both the main outlet 14 and the pilot outlet 61 is completely cut-off upon cooling of the bulb element 120 and no escape of fuel can occur. It is further apparent that if a leak develops in the actuating element 120—122 that a similar complete shut-off of fuel will occur.

As previously indicated, the recess 91 and the chamber 126 in which the various levers and actuating means are housed are both sealed off from the fuel passages. Consequently, these parts are not exposed to gum formation or corrosion tending to shorten their useful life or interfere with free operation. Moreover, both of the valve members 54 and 78 can be easily reached from the front of the body 10 for cleaning or repair by removal of the closure caps 57 and 81 respectively.

It will be understood that many changes may be made in the details of construction and arrangement of parts without departing from the scope of this invention as defined in the appended claims.

We claim:

1. A combined temperature and flame failure control comprising in combination, an axially reciprocable valve means biased toward closed position, a first thermally responsive device including a diaphragm unit positioned for movement on an axis substantially normal to said valve means, a second thermally responsive device including a movable rod element positioned for movement on an axis substantially parallel with said valve means, lever means including a bell-crank mounted on said diaphragm unit, said lever means being operatively engageable by said rod element intermediate said diaphragm unit and said valve means for pivotal movement relative to said valve means, adjustable means for setting the temperature to be maintained by said second thermally responsive device, second lever means responsive to movement of the first said lever means and being effective in one thermal condition of said first thermally responsive device for overcoming the bias of said valve means but being ineffective in another said condition thereof, and means cooperable with said diaphragm unit forming a relatively fixed pivot for said first lever means to maintain said temperature setting.

2. A combined temperature and flame failure control as claimed in claim 1 wherein the free movement of said first lever means is limited by a stop, and a lost motion connection operatively associated with said lever means for absorbing overtravel of said diaphragm unit after said first lever means operatively engages said stop.

3. A combined temperature and flame failure control comprising in combination, an axially reciprocable valve means biased toward closed position, a first thermally responsive device including a diaphragm unit positioned for movement on an axis substantially normal to said valve means, a second thermally responsive device including a rod element positioned for movement on an axis substantially parallel with said valve means, lever means including a bell-crank and a connecting lever extending between said diaphragm unit and said valve means, said connecting lever being operatively engageable by said rod element intermediate said diaphragm unit and said valve means for pivotal movement relative to said valve means, adjustable means for setting the temperature to be maintained by said second thermally responsive device, second lever means mounted for pivotal movement on said adjustable means and being operatively engageable with the first said lever means for overcoming the bias of said valve means in response to said pivotal movement of said first lever means, and means cooperable with said diaphragm unit forming a relatively fixed pivot for said first lever means to maintain said temperature setting.

4. A combined temperature and flame failure control as claimed in claim 3 wherein the free movement of said first lever means is limited by a stop, and yieldable means interposed between said bell-crank and said connecting lever providing a lost motion connection for absorbing overtravel of said diaphragm unit after said first lever means operatively engages said stop.

5. A combined temperature and flame failure control comprising in combination, an axially reciprocable valve means biased toward closed position, a first thermally responsive device including a diaphragm unit positioned for movement on an axis substantially normal to said valve means, a second thermally responsive device including a rod element positioned for movement between operative positions on an axis substantially parallel with said valve means, lever means including a bell-crank and a connecting lever extending between said diaphragm unit and said valve means, said connecting lever having operative engagement with said rod element intermediate said diaphragm unit and said valve means and being movable bodily by said diaphragm unit toward said rod element in one position thereof for pivotal movement thereby in another position thereof, adjustable means for setting the temperature to be maintained by said second thermally responsive device, and an operating lever mounted for pivotal movement on said adjustable means and having a free end interposed between said connecting lever and said valve means, said operating lever being effective in one thermal condition of said first thermally responsive device for overcoming the bias of said valve means upon movement of said rod element to said other position but being ineffective in another said condition thereof, and means cooperable with said diaphragm unit forming a relatively fixed pivot for said connecting lever to maintain said temperature setting.

6. A combined temperature and automatic pilot control comprising in combination, a pair of axially reciprocable valve means biased to a closed position, manually operable means for opening one of said pair of valve means, a first thermally responsive device including a diaphragm unit positioned for movement on an axis substantially normal to said pair of valve means, a second thermally responsive device including a rod element positioned for movement on an axis substantially parallel with said valve means, lever means mounted on said diaphragm unit and operatively engageable by said rod element intermediate said diaphragm unit and said valve means for pivotal movement relative to said other valve means, means responsive to movement of said lever means and being effective in one thermal condition of said first thermally responsive device for overcoming the bias of said other valve means but being ineffective in another said condition thereof, and a valve lever operable by said lever means for maintaining said one valve means in open position while said first thermally responsive device remains in said one thermal condition.

7. A combined temperature and automatic pilot control as claimed in claim 6 wherein the free movement of said lever means is limited by a stop, said valve lever being pivoted on said stop.

8. A combined temperature and automatic pilot control comprising in combination, a pair of axially reciprocable valve means biased toward closed position said valve means including main and pilot valve members, a manually operable lever for opening said pilot valve member, a first thermally responsive device including a diaphragm unit positioned for movement on an axis substantially normal to said valve means, a second thermally responsive device including a rod element positioned for movement between retracted and advanced positions on an axis substantially parallel with said valve means, lever means including a bell-crank and a connecting lever extending between said diaphragm unit and said main valve member, said connecting lever having operative engagement with said rod element intermediate said diaphragm unit and said valve means, said connecting lever being movable bodily by said diaphragm unit toward said rod element in said retracted position thereof for pivotal movement thereby in said advanced position, an operating lever responsive to movement of said connecting lever and being effective in one thermal condition of said first thermally responsive device for overcoming the bias of said main valve member upon movement of said rod element to said advanced position but being ineffective in said retracted position thereof, and a pilot valve lever operable by said lever means for maintaining said pilot valve member in open position while said first thermally responsive device remains in said one thermal condition.

9. A combined temperature and automatic pilot control comprising in combination, a pair of axially reciprocable valve means biased toward closed position, said valve means including main and pilot valve members, a manually operable lever for opening said pilot valve member, a first thermally responsive device including a diaphragm unit positioned for movement on an axis substantially normal to said valve means, a second thermally responsive device including a rod element positioned for movement between retracted and advanced positions on an axis substantially parallel with said valve means, said diaphragm unit being movable toward said rod element upon said first thermally responsive device being heated, lever means including a bell-crank and a connecting lever extending between said diaphragm unit and said main valve member, said connecting lever having operative engagement with said rod element intermediate said diaphragm unit and said valve means, said connecting lever being movable bodily by said diaphragm unit toward said rod element in said retracted position thereof for pivotal movement thereby in said advanced position, adjustable means for setting the temperature to be maintained by said second thermally responsive device, an operating lever mounted for pivotal movement on said adjustable means and having a free end interposed between said connecting lever and said main valve member, said operating lever being effective for overcoming the bias of said main valve member upon movement of said rod element to said advanced position but being ineffective in said retracted position thereof, and a pilot valve lever operable by said lever means for maintaining said pilot valve member in open position while said first thermally responsive device remains heated.

SAMUEL G. ESKIN.
HAROLD W. RICE.
ADELE M. ARKELYAN.

REFERENCES CITED

The following references are of record in the file of this patent:

UNITED STATES PATENTS

| Number | Name | Date |
|---|---|---|
| 1,953,446 | Strong | Apr. 3, 1934 |
| 2,085,300 | Dillman | June 29, 1937 |
| 2,163,801 | Newell | June 27, 1939 |
| 2,303,128 | Koppel | Nov. 24, 1942 |
| 2,387,164 | McCarty | Oct. 16, 1945 |